Nov. 12, 1957     C. C. ATHMANN     2,812,788
SUPPORT FOR CIRCUMFERENTIALLY TRAVELLING TYPE
TIRE MOUNTING AND DEMOUNTING APPARATUS
Filed June 2, 1954     2 Sheets-Sheet 1
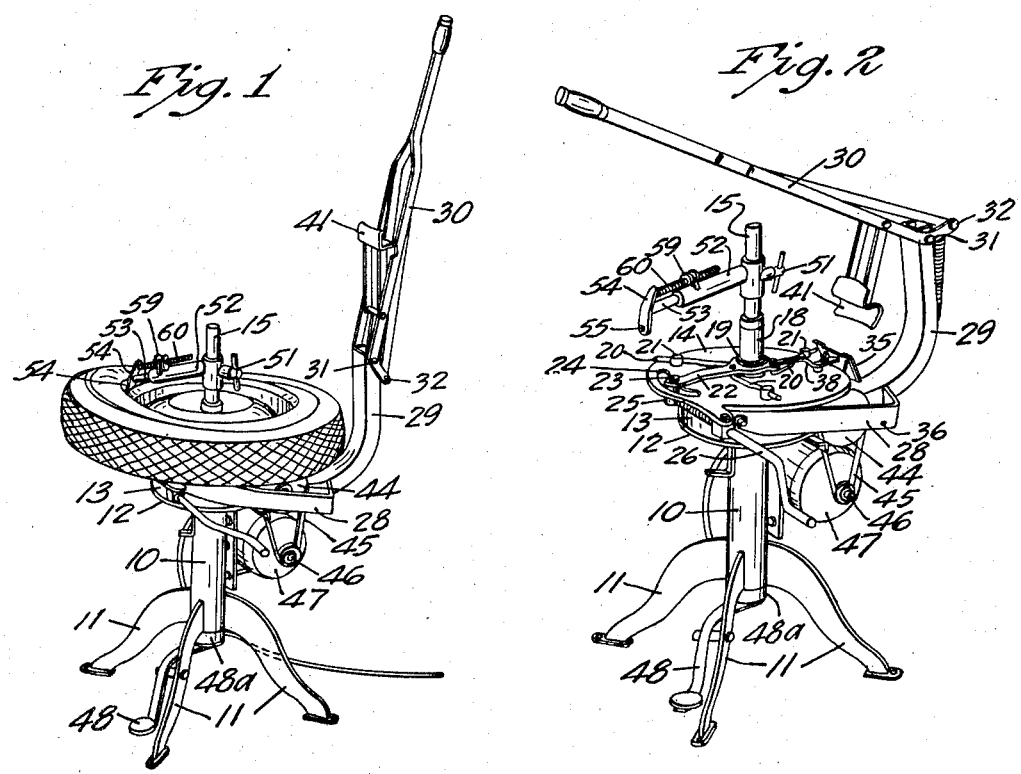

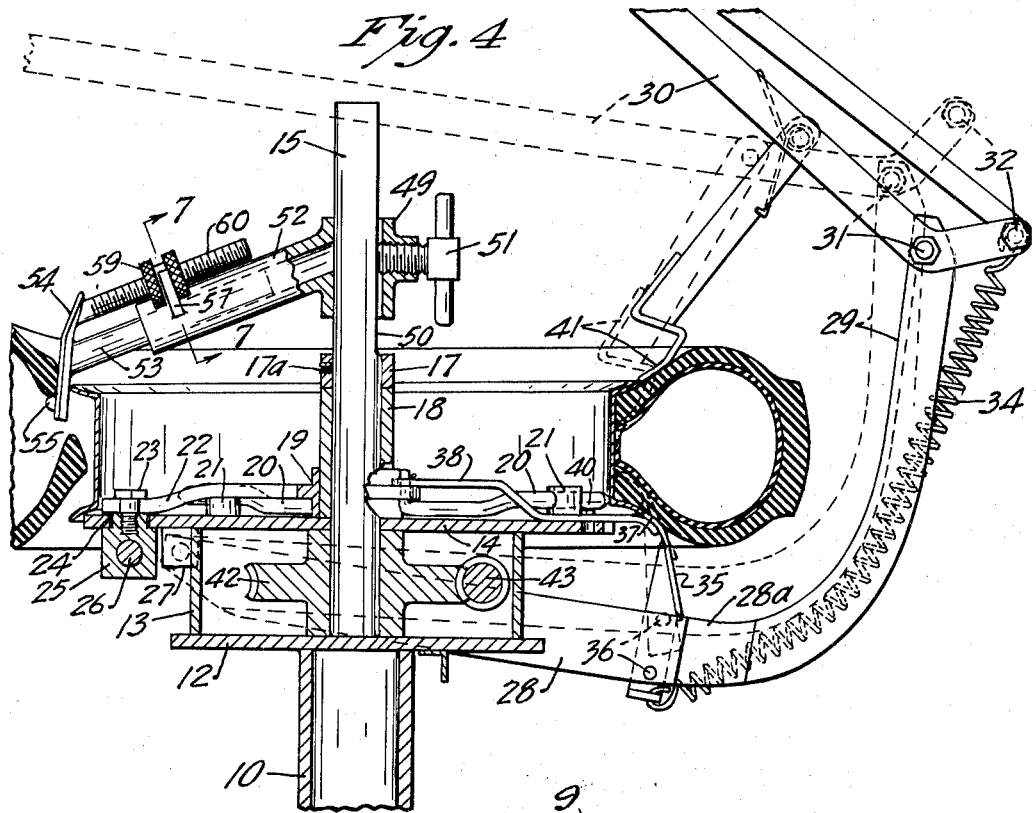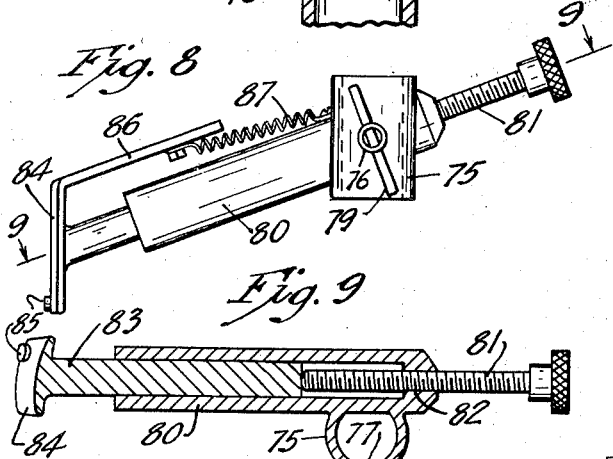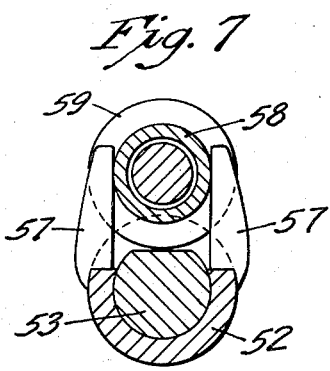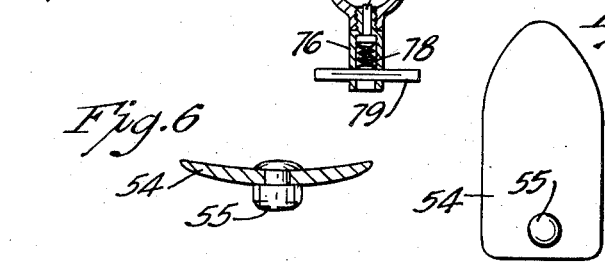

United States Patent Office 2,812,788
Patented Nov. 12, 1957

2,812,788
SUPPORT FOR CIRCUMFERENTIALLY TRAVELLING TYPE TIRE MOUNTING AND DEMOUNTING APPARATUS

Chrys C. Athmann, Melrose, Minn.

Application June 2, 1954, Serial No. 433,999

1 Claim. (Cl. 144—288)

This invention relates to apparatus for mounting and dismounting pneumatic tire casings.

This application is a continuation of my co-pending application entitled Support for Circumferentially Travelling Type Tire Mounting and Demounting Apparatus, Serial Number 99,214, filed June 15, 1949, now Patent No. 2,695,659, and is directed toward the patentable subject matter contained therein not covered by the claims of said prior patent.

A general object of the invention is to provide a machine which will initially break the beads of the tire casing loose from the rim, and then will successively lift or remove the beads from the confinement of the rim.

Another object of the invention is to provide a machine which will replace the casing on the rim in an operation which is just the reverse of the removal operation, but where the two opposite functions are performed with the same parts of the apparatus.

Another object is to provide such apparatus which can be readily adjusted to accommodate different sizes of rims and casings.

The above and other objects and advantages of the invention will more fully appear from the following description made in connection with the accompanying drawings, wherein like reference characters refer to the same parts throughout the views, and, in which:

Fig. 1 is a perspective view of the apparatus with a casing thereon and being removed or replaced;

Fig. 2 is a perspective view of the machine in position for initially breaking the casing beads loose from the rim flanges;

Fig. 3 is an enlarged plan view with the upper lever unit broken away;

Fig. 4 is an enlarged fragmentary vertical sectional view;

Fig. 5 is an enlarged front elevational view of the rim manipulating shoe;

Fig. 6 is a sectional view of the shoe of Fig. 5;

Fig. 7 is an enlarged section taken on the line 7—7 of Fig. 4;

Fig. 8 is a side view of another form of rotary radial arm, and

Fig. 9 is a section taken on the line 9—9 of Fig. 8.

The apparatus is mounted on a frame having a vertical tubular post 10 supported by four legs 11. As shown in Fig. 4, a casing having a circular bottom plate 12 is mounted on the top of the post 10. The plate 12 of the casing has a circular casing wall 13 mounted thereon. On the upper edge of the casing wall 13 is a larger circular top plate 14.

A vertical shaft 15 extends upwardly through the plate 14 and some distance thereabove. The shaft 15 is supported by a collar 17, having a set screw 17a therein and resting upon the upper end of a sleeve 18, which is secured to and extends upwardly from the center of the large circular plate 14. About this sleeve is a flanged collar 19 having three rim clamping arms 20 pivotally connected thereto and extending outwardly therefrom. These arms have their outer ends slidably supported by studs 21 which extend upwardly from the large plate 14. A lever 22 is formed integrally with and extends radially outwardly from the flanged collar 19. Its outer end carries a stud 23 which extends through an arcuate slot 24 in the plate 14. This stud 23 is threaded into a nut 25 which in turn is mounted on a threaded crank 26. The crank 26 is pivotally mounted upon the plate 14 as shown at the lower left hand corner of Fig. 3 and is supported thereby for rotation about its longitudinal axis. When the crank is rotated, the lever 22 will swing about the shaft 15 and relative to the plate 14. This will cause the rim clamping arms to move inwardly or outwardly, depending upon the direction of movement of the crank.

A pair of small blocks 27 is mounted on the under side of the plate 14. Spaced arms 28 are pivotally connected to the blocks, and these arms extend beneath the plate 14 at opposite sides of the casing wall 13. As shown in Fig. 3, the arms 28 have converging forward portions 28a and at their front ends are connected to a channel shaped lever 29 which curves upwardly above the plate 14 for a considerable distance. A hand lever 30 is pivotally connected to the lever 29 at 31, and this hand lever extends forwardly above the remainder of the machine in one position thereof which is shown in Fig. 2, but can be swung upwardly and rearwardly to the raised position shown in Fig. 1.

The hand lever 30 extends slightly beyond the pivot pin 31 and carries a cross stud 32 upon which is a sleeve 33 shown in Fig. 3. A tension spring 34 is connected between the sleeve 33 and a casing bead engaging shoe 35 which is pivotally carried by a bar 36 which extends between the spaced arms 28. This shoe has a generally upstanding curved blade portion 37.

Pivotally connected to the flanged collar 19 is a bead shoe adjusting lever 38. This lever has an elongated slot 39 therein, and a guide pin 40 extends through the slot and is anchored in the large plate 14. When the crank 26 is rotated to extend the rim clamping arms 20 outwardly, the bead shoe adjusting lever 38 will also move outwardly and similarly move the pivoted bead shoe 35.

The hand lever 30 has a bead shoe 41 pivotally supported thereby. This shoe is shown to extend downwardly and generally toward the first described bead shoe 35, 37.

Within the circular casing at the upper end of the post 10 on the shaft 15 is a worm gear 42. Meshed with it is a worm 43, at least one end of which extends outwardly through the circular casing wall 13 and has a pulley 44 thereon. The pulley is connected by a belt 45 to a pulley on the shaft 46 of a motor 47. The motor is conveniently provided with a foot control 48 pivotally carried by one of the legs 11 and connected to a suitable switch 48a.

The vertical shaft 15 has a collar 49 mounted on its upper end portion. The shaft is flatted along one side as shown at 50 in Fig. 3, and a set screw 51 is threaded through the collar 49 and bears against the flatted portion of the shaft so that the collar will rotate with the shaft.

A tubular member 52 extends outwardly and downwardly from the collar 49. Longitudinally slidable in it is a post 53 having a casing bead manipulating blade 54 thereon. This blade has a button 55 extending outwardly therefrom. The tubular member 52 has a fork 57 extending upwardly from its outer end. Lying in the fork is the reduced portion 58 of a circular nut 59, which is threadedly carried on a threaded shaft 60. This shaft extends from the casing bead manipulating blade 54 and lies above the tubular member 52 and post 53. Turning of the nut 59 will move the blade 54 inwardly and outwardly relatively to the vertical shaft 15.

When a tire casing is to be removed from a rim, the wheel and tire are laid upon the plate 14, the shaft 15 extending up through the central opening of the wheel. Around a portion of the edge of the plate 14 adjacent the arcuate slot 24 are marks 61, representing different wheel or rim sizes. The crank 26 can be turned to bring the lever 22 to a point just short of the wheel size indication desired, before placing the wheel in position. Then the crank is turned to cause the arms 20 to expand against the inner circumference of the rim. Since the arms 20 all move together, the wheel will be automatically centered on the apparatus.

As the rim or wheel is clamped in position as described above, the bead breaker shoe adjusting lever 38 will be moved correspondingly and will locate the lower bead breaker shoe 37 in the proper position to contact the edge of the lower bead of the tire casing. The hand lever 30 is then swung down to bring the upper bead breaker shoe 41 into contact with the edge of the upper bead of the tire casing. This shoe is shown to be angular in shape so that it will travel downwardly until the angle engages the wheel rim. When the hand lever is pulled down, inward pressure will be applied transversely of the tire and the beads will be broken loose adjacent the points where the shoes 37 and 41 engage them.

When the beads have been loosened adjacent the shoe 41 only, a hand tool is inserted between the bead and rim and a short section of the bead is pried up or off of the rim. The bead manipulating blade 54 is adjusted outwardly and vertically so that it will lie approximately as shown in Fig. 4, with the upper bead of the tire casing lying upon the button 55. The motor control member is pressed with the foot and the arms 52, 53 will rotate, carrying the bead manipulating shoe 54 about in a circular path. The button 55 will lift the tire bead as it rotates until the entire upper bead has been removed from the rim.

If it is desired to remove the casing entirely from the rim, the other bead can be removed in the same manner as just described.

When a tire casing is to be placed on a rim, one side is put on at a time. The shoe 54 is slipped between the rim and the bead, the button 55 riding upon the upper edge of the bead being replaced. When the arm 52, 53 is rotated, the button 55 will force succeeding portions of the bead downwardly past the rim flange. When the arm 52, 53 has completed one revolution it is stopped and the arm is moved upwardly on the vertical shaft 15 to remove the shoe 54 from between the rim and bead of the tire casing. After both beads have been replaced in this manner, said arm is completely removed from the shaft and the wheel and tire can be taken from the apparatus, the clamping arms 20, of course, having been loosened to free the rim.

Figs. 8 and 9 illustrate a little different form of rotary arm unit. There is shown a vertical sleeve 75 which is adapted to be mounted on the vertical post 15. A tubular shank 76 is threaded into the sleeve and it carries a pin 77 which is urged inwardly by a spring 78 interposed between said pin and a cross pin 79, which extends through the outer part of the tubular element 76. This structure permits the sleeve 75 to be relatively tightly engaged with the vertical post 15, but prevents it from locking so that it is difficult to remove.

The sleeve 75 has a diagonally disposed tubular barrel 80 welded thereto. A screw threaded member 81 is threaded through the end 82 of the barrel 80 and its inner end bears against a rod 83 which is longitudinally slidable in the tubular arm 80. The outer end of the rod 83 has a shoe 84 mounted thereon, said shoe being generally perpendicular, as shown in Fig. 8, and turned on its vertical axis to a slight angle as indicated in Fig. 9. On the outer face of the shoe 84 adjacent one lower corner thereof is a button 85 similar to the button 55 shown on the shoe 54 in the first described embodiment.

The shoe 84 has an upward and inward extension 86 and this is connected by the tension spring 87 to the tubular arm 80 so that the shoe unit will slide inwardly when the screw 81 is backed up.

The apparatus is adapted for use in tire shops where a great number of tires are mounted and/or dismounted. Ordinarily a large number of tires of the same size is handled, so that there is no great amount of adjustment needed. It is particularly useful for handling truck tires having drop center rims, and other types where they are new and tight or may have been on the rim for a long time and have become rusted to the rim.

It will, of course, be understood that various changes may be made in the form, details, arrangement and proportions of the various parts without departing from the scope of my invention.

What is claimed is:

In a tire casing mounting and demounting tool, the combination of a support on which a tire-carrying rim is adapted to be placed at rest upon one side, a vertically mounted power driven rotatable shaft extending upwardly at the center of said support, said shaft adapted to have tire removing mechanism removably mounted thereon, and rim-securing mechanism pivotally mounted on said shaft and rotatable thereabout and including a sleeve pivotally mounted on said shaft and a plurality of outwardly extending rim-engaging arms pivotally connected to the peripheral portions of said sleeve at their inner ends and means pivotally mounted on said support to slidably receive said arms intermediate their ends for restraining the same from rotation with the sleeve but permitting their shifting longitudinally upon the pivoting of said sleeve about said shaft to positively engage the rim of the wheel when said sleeve is rotated in one direction and to disengage the rim when rotated in the opposite direction.

References Cited in the file of this patent

UNITED STATES PATENTS

| | | |
|---|---|---|
| 776,831 | Geddes | Dec. 6, 1904 |
| 1,793,864 | Manley | Feb. 24, 1931 |
| 2,505,172 | Coats | Apr. 25, 1950 |
| 2,569,788 | Weaver | Oct. 2, 1951 |
| 2,569,789 | Weaver | Oct. 2, 1951 |
| 2,609,039 | Henderson | Sept. 2, 1952 |
| 2,695,659 | Athmann | Nov. 30, 1954 |